Figures 1, 2:
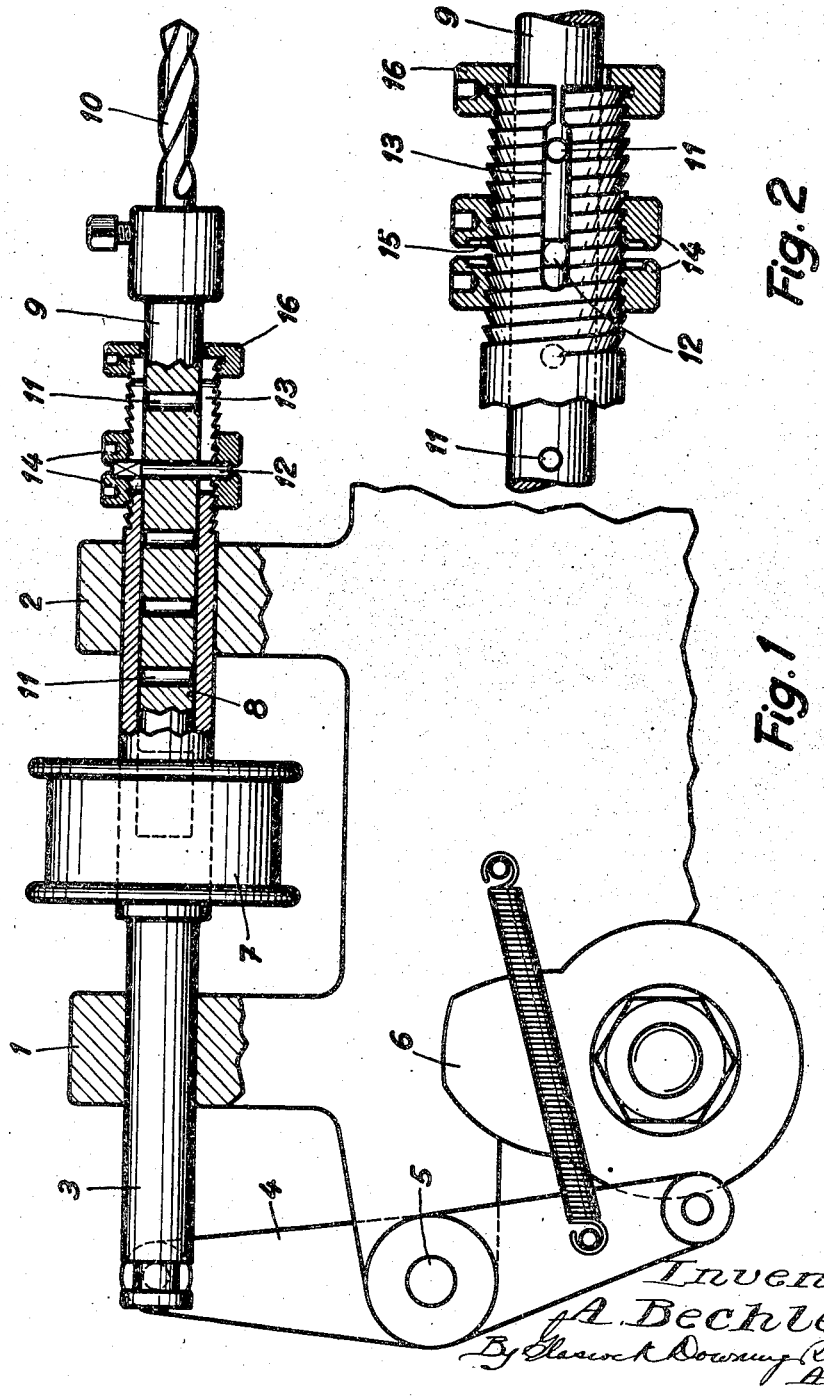

July 12, 1949. A. BECHLER 2,475,734
ACCESSORY DRILL FOR AUTOMATIC LATHES
Filed May 8, 1946

Inventor
A. Bechler

Patented July 12, 1949

2,475,734

UNITED STATES PATENT OFFICE 2,475,734

ACCESSORY DRILL FOR AUTOMATIC LATHES

André Bechler, Moutier, Switzerland

Application May 8, 1946, Serial No. 668,035
In Switzerland March 12, 1946

3 Claims. (Cl. 279—58)

In automatic lathes, apparatus called accessory drills comprising a spindle with drill at one of the extremities are often used. At the required point in the cycle of operations this spindle can be brought into the turning axis and applied to the work by a system of levers controlled by a cam. Owing to the varying length of the work and depth of the bores required, the initial position of the drill must be adjustable. To this end, a drill-collet is fitted into the broaching of the spindle and both are coupled by means of a pin passing through them together. It is rarely possible to obtain with this coupling the exact position required of the cutting edges of the drill. Fine adjustment is usually obtained by means of a stop-screw provided, preferably, at the end of the spindle not containing the drill, i. e. at the place where the last lever of a system operated by a cam acts directly upon the spindle. This method has its disadvantages as experienced only too well by professional workers. The object of the invention is an accessory drill for all automatic lathes of this kind, in which the drill-collet is held within an axial bore of the spindle of the accessory machine tool and is characterised by the fact that the passage for the pin coupling it to the spindle consists of two grooves diametrically facing each other, in which the exact position of the pin can be adjusted by means of collar-nuts engaging in the spindle-thread and pressing on each side of the said pin.

Preferably, the collars are recessed in order to prevent the pins from coming out under centrifugal action.

The spindle should, as a rule, be slit right up to its end, at which a clamping collar can be provided so as to take up any clearance between the drill-collet and the spindle on tightening.

The attached drawing shows, by way of example, and somewhat schematically, the accessory drill according to the invention.

Fig. 1 is a partial section along the turning axis,

Fig. 2, a partial top view.

The automatic lathe, to which the accessory machine tool belongs, is not represented.

The means by which the spindle of the accessory tool is brought into line with the turning axis is also not represented.

The drill-spindle turns in the bearings 1 and 2; the former is connected in some way, at its extremity not containing the drill, to a lever 4 pivoted at 5 and acted upon by a cam 6, the lobe of which, on turning, causes the spindle 3 to move axially.

The spindle is broached at 8 in order to take the collet of the drill 10. This collet is provided with equally spaced diametrical bores 11 having the same size as the pin 12 with square head passing through the collet and spindle together.

A slot 13 of varying width is provided in the spindle right up to its end, so that the pin can take up different positions by adjustment of collar nuts 14. The collars are recessed at 15 (see Fig. 2) and can move over a distance corresponding to at least the space between two bores 11, thus carrying with them indirectly the cutting tool. The adjustment is effected with one of the two collars and the pin is blocked by means of the other, which thus forms with the first a lock-nut. The concentric recesses 15 prevent the pin from flying out under centrifugal action.

A third collar 16 is provided at the extremity of the spindle. On tightening it up, the pressure of its thread on the flank of the thread of trapezoidal section of the spindle tends to squeeze the two free halves of the spindle end together in order to take up any clearance between the collet and the spindle.

What I claim is:

1. In an accessory drill for automatic lathes, a hollow drill spindle with an axial slot and with external threads, a drill collet with a radial hole, adjustably inserted in said hollow drill spindle, a pin in said radial hole, passing through said slot, two separate nuts adjustably screwed on said external threads to be axially displaced towards and from each other, the one at the one side of said pin to displace the latter, and the other at the other side of said pin to secure the latter in adjusted position and in this way to rigidly fix said drill collet to said drill spindle.

2. In an accessory drill for automatic lathes, a hollow drill spindle with external threads and axial slots lying counter to one another, a drill collet with radial holes disposed at an axial distance from one another, said drill collet being adjustably inserted in said hollow drill spindle, a pin removably inserted in one of said radial holes, passing through said slots, two separate nuts with a recessed side face, adjustably screwed on said external threads to be axially displaced towards and from each other, the one at the one side of said pin to displace the latter, and the other at the other side of said pin to hold the pin secured against axial and radial displacement in the space formed by said recessed side faces and in this way to rigidly fix said drill collet to said drill spindle.

3. In an accessory drill for automatic lathes, a hollow drill spindle with external threads of trapezoidal section, and with axial slots open at the end face of said drill spindle, a drill collet with a radial hole, adjustably inserted in said hollow drill spindle, a pin in said radial hole, passing through said slots, two nuts with a recessed side face, adjustably screwed on said external threads, the one at the one side of said pin and the other at the other side of said pin to hold the pin secured against axial and radial displacement in the space formed by said recessed side faces, and a collar screwed to the slotted end of said drill spindle to take up any clearance between said drill collet and said drill spindle.

ANDRÉ BECHLER.

REFERENCES CITED

The following references are of record in the file of this patent:

UNITED STATES PATENTS

| Number | Name | Date |
|---|---|---|
| 148,670 | Collins et al. | Mar. 17, 1874 |
| 514,004 | Howard | Feb. 6, 1894 |
| 1,075,699 | Dechnik | Oct. 14, 1913 |
| 1,385,501 | Shreve | July 26, 1921 |
| 1,801,883 | Smith | Apr. 21, 1931 |
| 1,867,359 | Higby | July 12, 1932 |
| 1,946,158 | Gorg | Feb. 6, 1934 |